United States Patent [19]
Garner

[11] 3,816,903
[45] June 18, 1974

[54] METHOD OF FABRICATING AN IMPREGNATED POROUS METAL MOULD

[75] Inventor: Paul Johnson Garner, Thorp Bay, England

[73] Assignee: Imperial Chemical Industries Limited, London, England

[22] Filed: Apr. 24, 1972

[21] Appl. No.: 246,925

Related U.S. Application Data

[63] Continuation-in-part of Ser. No. 886,782, Dec. 19, 1969, abandoned.

[52] U.S. Cl............. 29/527.2, 29/DIG. 39, 164/19, 164/46, 204/38 E, 264/225
[51] Int. Cl............................................ B23p 17/00
[58] Field of Search............ 204/6, 9, 15, 20, 38 B, 204/38 E; 264/225, 227; 164/6, 15, 19, 46; 29/527.2, 527.3, DIG. 39

[56] References Cited
UNITED STATES PATENTS

| | | | |
|---|---|---|---|
| 1,681,447 | 8/1928 | Torrison | 204/6 UX |
| 1,935,916 | 11/1933 | Ragsdale | 164/46 X |
| 2,680,699 | 6/1954 | Rubin | 204/20 X |
| 2,793,177 | 5/1957 | Fourier | 204/20 X |
| 3,101,065 | 8/1963 | Kalis | 264/225 UX |
| 3,424,635 | 1/1969 | Grandinetti et al. | 204/6 X |
| 3,548,050 | 12/1970 | Mozer | 264/227 |

OTHER PUBLICATIONS

W. Brenner et al., "Sprayed Metal Molds," Plastics Engineering, Vol. 30, September 1952, pp. 105–109, 112, 114, 116.

Primary Examiner—Charles W. Lanham
Assistant Examiner—D. C. Reiley, III
Attorney, Agent, or Firm—Cushman, Darby & Cushman

[57] ABSTRACT

Producing a mould, particularly a prototype mould by spraying a metal shell on to model, impregnating the metal shell by application of a curable resin to the moulding surface, curing the resin and backing the shell to produce the mould.

11 Claims, No Drawings

METHOD OF FABRICATING AN IMPREGNATED POROUS METAL MOULD

This application is a continuation-in-part of application Ser. No. 886 782 filed Dec. 19 1969 now abandoned.

The present invention relates to a process for the production of moulds. In particular the present invention is concerned with the production of moulds suitable for the moulding of thermoplastic materials.

According to the present invention we provide in a process for making a mould comprising forming by spraying a shell of metal to the shape required to define at least part of a mold cavity, the improvement comprising impregnating the shell by applying a curable resin to at least the moulding surface of said shell and curing the resin.

The present invention also provides moulds whenever made by this process.

It is to be understood that the term "moulding surface" refers to the surface of the metal shell against which material being fabricated is to be moulded in the finished mould.

The process of the present invention is particularly applicable to the production of moulds by the processes described in our copending U.S. application Nos. 886,690, now abandoned, and 885,172, now abandoned, and U.S. Pat. No. 3 638 299 in which a mould is manufactured by forming a shell of metal around a model of the article to be moulded and pipes are fixed to the said metal shell which is then backed with concrete to encase the pipes whilst leaving their ends exposed. The present invention is particularly relevant to these processes when the metal shell is formed by metal spraying, in particular by flame spraying.

Our invention is particularly useful in the production of moulds which are used in injection moulding. These moulds are generally known as split moulds and are made in two halves and the two halves may conveniently be made separately by the process of the present invention and then located together. Alternatively, and as is preferred, one half may be made by the process of this invention and this first half used as a model for the production of the other half of the moulding.

The shell of the metal may conveniently be formed around a model of the article to be moulded which may be made in any required manner and may be of any suitable material providing it is not adversely affected by the conditions used during metal spraying. The model may be made of wood, metal, plaster, synthetic thermoplastic, thermosetting resins, rubber especially silicone rubber, wax, plasticine, clay or glass reinforced polyester resin. We prefer that the model be mounted on a wood or metal base which has angled edges which provides means of keying the sprayed metal coating around the model, as is described in our U.S. Pat. No. 3 638 299. The model should preferably contain cooling pipes which should be fixed as close to the surface to be sprayed as possible. We further prefer that the model is sprayed with a release agent such as polyvinyl alcohol before spraying with metal. The release agent allows the metal shell to be parted readily from the model when immersed in water and also assists in the satisfactory laying down of the initial coating of the sprayed metal.

The metal shell can be formed by compressed air spraying of molten metal or by flame spraying, as these techniques are particularly convenient for applying metal layers. However, flame sprayed shells tend to be very porous and thus the present invention is particularly concerned with metal shells formed by flame spraying where impregnation with a curable resin according to the process of the present invention blocks the pores in the region of the moulding surface and prevents the material which is moulded penetrating into the metal shell through said moulding surface.

It is important in our process that the curable resin be applied to at least the intended moulding surface of the metal shell. If the curable resin is only applied to the surface of the shell which is not intended to be the moulding surface (the non-moulding surface), i.e., to the surface opposite the moulding surface on the other side of the shell, then the curable resin will not effectively, if at all, block the pores in the region of the moulding surface and will therefore not effectively prevent the material being moulded penetrating into the mould shell. It is, of course, within the scope of our invention that the curable resin be applied only to the moulding surface.

Any metal from which a shell can be formed may be used in our invention but we prefer that if the metal shell is formed by flame spraying the metal is zinc, because this provides a particularly true reproduction of the model surface. Another suitable metal is aluminium because it is light and has little tendency to crack, is high melting which enables higher moulding temperatures to be used and is readily sprayed at a high rate.

The most convenient way of impregnating the metal shell with a curable resin is to dip the shell in a bath of the liquid resin so that the resin is either applied to the moulding surface alone or to the moulding surface and to the non-moulding surface; the resin may be in solution, dispersion or heated to above its melting point whichever is most suitable depending on the nature of the resin. The shell, impregnated with the resin is then removed from the bath of the resin, wiped to remove any excess resin from its surface and dried. Our preferred form of resins are those which may be cured to a hard, heat resistant form and epoxy, polyester resins and amine aldehyde or phenol aldehyde condensation resins are our preferred materials. We prefer that the resin should be inert to the material to be moulded and stable at the moulding temperatures.

We have set out above a process for the production of mould shells which may be used to provide the moulding surfaces in moulds particularly in moulds used in plastics fabrication. However, the metal shells are fragile and it is therefore necessary to provide strengthening and where necessary to enable the mould to be used in moulding operations where the mould is subjected to high pressures. This is particularly important if the mould is to be used in injection moulding operations. The nature of the backing that is necessary will depend upon the use to which the mould is to be put. For example, if the mould is to be used for vacuum forming of thermoplastics or in the rotational moulding it will not be subjected to particularly high pressures during moulding and the necessary support may be provided by a simple framework. For example the sprayed metal layer may be particularly thick or the shell may be backed with cement, plaster of paris or an epoxy resin.

On the other hand if the impregnated metal shells of the present invention are to be used as the mould defining surfaces of injection moulds the shell should be backed with a material that will enable the mould to withstand high pressures. The mould should be able to withstand the high pressures due to the injection of the thermoplastic materials into the mould and also the forces due to the closing of the two halves of the injection mould. In conventional injection moulding processes the thermoplastic material is cooled after it has been injected into the mould and thus we prefer that, when the impregnated metal shells of the present invention are used in injection moulds they should be backed with cooling pipes. A particularly suitable way of backing the impregnated metal shell in the production of an injection mould is described and illustrated in our co-pending U.S. application No. 886,690.

The reinforcing backing for the mould may be applied either before the shell has become impregnated with a curable resin or afterwards. We prefer, however, to provide the shell with at least some reinforcing backing before impregnation is carried out in order to be able to handle the fragile metal shell more easily and prevent distortion thereof during impregnation.

I claim:

1. In a process for making a mould comprising forming by spraying a porous shell of metal to the shape required to define at least part of a mould cavity, the improvement comprising impregnating the porous shell by applying a curable resin to at least the moulding surface of said shell and curing the resin, whereby said resin penetrates into and blocks the pores in the region of the moulding surface and thereby prevents material being moulded in the mould from penetrating into the metal shell through said moulding surface.

2. A process according to claim 1 in which the metal shell is provided with a reinforcing backing before it is impregnated with a curable resin.

3. A process according to claim 1 in which the metal shell is formed by spraying metal on to a model of the article to be moulded.

4. A process according to claim 3 in which the model is coated with a release agent before spraying the metal.

5. A process according to claim 1 in which the metal shell is formed by flame spraying.

6. A process according to claim 1 in which the metal is zinc.

7. A process according to claim 1 in which the metal shell is at least 1/16 inch thick.

8. A process according to claim 1 in which the metal shell is about 0.25 inch thick.

9. A process according to claim 1 in which the resin comprises an epoxy resin.

10. A process according to claim 1 in which the resin comprises a polyester resin.

11. A process according to claim 1 in which the resin comprises amine aldehyde or phenol aldehyde condensation resin.

* * * * *

UNITED STATES PATENT OFFICE
CERTIFICATE OF CORRECTION

Patent No. 3,816,903     Dated June 18, 1974

Inventor(s) Paul Johnson Garner

It is certified that error appears in the above-identified patent and that said Letters Patent are hereby corrected as shown below:

Please add the following to the front page format after the application number:

[30] Foreign Application Priority Data

June 23, 1969     Great Britain     31606/69

Signed and Sealed this twenty-fifth Day of November 1975

[SEAL]

Attest:

RUTH C. MASON
Attesting Officer

C. MARSHALL DANN
Commissioner of Patents and Trademarks